(12) United States Patent
Nagano et al.

(10) Patent No.: US 8,216,490 B2
(45) Date of Patent: Jul. 10, 2012

(54) AQUEOUS PRIMER COMPOSITION AND A PROCESS FOR THE APPLICATION OF THE SAME

(75) Inventors: Toshiaki Nagano, Yokohama (JP); Yasuyuki Kataoka, Yokohama (JP); Minoru Ishikura, Odawara (JP); Terutaka Takahashi, Hiratsuka (JP); Hideo Sugai, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 1118 days.

(21) Appl. No.: 12/083,763

(22) PCT Filed: Oct. 18, 2006

(86) PCT No.: PCT/JP2006/321191
§ 371 (c)(1),
(2), (4) Date: Apr. 18, 2008

(87) PCT Pub. No.: WO2007/046532
PCT Pub. Date: Apr. 26, 2007

(65) Prior Publication Data
US 2009/0130322 A1     May 21, 2009

(30) Foreign Application Priority Data

Oct. 18, 2005 (JP) ................... 2005-302567
Apr. 21, 2006 (JP) ................... 2006-117438

(51) Int. Cl.
*H01B 1/00* (2006.01)
(52) U.S. Cl. ........ 252/500; 252/511; 252/512; 427/123; 427/407.1; 524/504; 524/570
(58) Field of Classification Search .......... 252/500, 252/511, 512; 427/123, 407.1; 524/504, 524/570
See application file for complete search history.

(56) References Cited

U.S. PATENT DOCUMENTS

| | | | | |
|---|---|---|---|---|
| 4,883,834 A | * | 11/1989 | Yamamoto et al. | ........... 524/504 |
| 5,425,969 A | | 6/1995 | Wakabayashi et al. | |
| 5,575,957 A | | 11/1996 | Okuda et al. | |
| 5,705,098 A | | 1/1998 | Okuda et al. | |
| 6,495,224 B1 | | 12/2002 | Dutton | |
| 7,235,610 B2 | | 6/2007 | Fujino et al. | |
| 2004/0222406 A1 | | 11/2004 | Chen et al. | |
| 2005/0203242 A1 | * | 9/2005 | Nakayama et al. | ........... 524/570 |
| 2007/0259123 A1 | * | 11/2007 | Nagano et al. | ............. 427/407.1 |

FOREIGN PATENT DOCUMENTS

| | | | |
|---|---|---|---|
| EP | 1 780 249 | | 5/2007 |
| JP | 59-203498 | | 11/1984 |
| JP | 61-218639 | | 9/1986 |
| JP | 62-283134 | | 12/1987 |
| JP | 5-1221 | | 1/1993 |
| JP | 06-165966 | | 6/1994 |
| JP | 06-336568 | * | 12/1994 |
| JP | 09-012314 | | 1/1997 |
| JP | 10-053417 | | 2/1998 |
| JP | 2002-121462 A | | 4/2002 |
| JP | 2003-201439 | | 7/2003 |
| JP | 2003-327761 A | | 11/2003 |
| JP | 2004-051808 | * | 2/2004 |
| JP | 2004-091559 | | 3/2004 |
| JP | 2004-331911 | * | 11/2004 |
| WO | WO 2006/019171 | * | 2/2006 |

OTHER PUBLICATIONS

Supplementary European Search Report issued Jun. 18, 2010 in corresponding European Patent Application No. 06 82 2169.

* cited by examiner

*Primary Examiner* — Khanh Tuan Nguyen
(74) *Attorney, Agent, or Firm* — Wenderoth, Lind & Ponack, L.L.P.

(57) ABSTRACT

This invention provides an aqueous primer composition which comprises (A) an aqueous dispersion of modified polyolefin which comprises an unsaturated carboxylic acid- or acid anhydride-modified polyolefin (a) having a melting point of 120° C. or lower and a weight average molecular weight of 30,000 to 180,000, dispersed in an aqueous medium, (B) an ionic functional group-containing acrylic resin, and (C) a conductive carbon-containing pigment, and which forms a coating film with an L value of 35 or more and a surface resistivity of $1 \times 10^8 \Omega/\square$ or less.

18 Claims, No Drawings

AQUEOUS PRIMER COMPOSITION AND A PROCESS FOR THE APPLICATION OF THE SAME

TECHNICAL FIELD

The present invention relates to an aqueous primer composition which is capable of giving electrical conductivity to a coating film while maintaining value, and also capable of forming a coating film excellent in water resistance, adhesion and the like, and to a process for coating a plastic molding with said composition.

BACKGROUND ART

Polyolefin moldings which are composed of a unit of olefin such as ethylene and propylene are substituting for metal, in the production of members of automobile exterior panels and of domestic electrical products. Such moldings are often coated with a two-pack top coating which contains a polyisocyanate compound. Before such a top coating is applied, a chlorinated polyolefin-containing primer is usually applied with a view to improving adhesion between a film of the top coating and the molding.

To polyolefin moldings, rubber components (such as styrene-butadiene rubber and isoprene rubber) have heretofore been added for the purpose of improving adhesion and impact resistance. These years, however, the amount of said rubber components has been reduced, resulting in a problem that such a primer as mentioned above has decreased in adhesion to moldings.

In order to solve this problem, Applicant has previously proposed a primer which comprises a specific chlorinated polyolefin and a specific blocked polyisocyanate used in combination with a polyol resin (Japanese Patent Application KOKAI Publication No. 2002-121462).

For the above-mentioned primer, aromatic organic solvent such as toluene and xylene is used for the sake of the solubility of said chlorinated polyolefin. Thus, from the viewpoint of safety, hygiene and environmental protection, there has been a demand for aqueous primer.

To meet this demand, the production of aqueous dispersion of chlorinated polyolefin has been tried in various ways (e.g., Japanese Patent Application KOKAI Publication Nos. 2003-327761 and 2004-91559).

On the other hand, since the above-mentioned moldings have usually a volume resistivity of about $10^{10}$ $\Omega$·cm or more, it is difficult to directly apply a top coating to such a plastic molding by electrostatic deposition having good application efficiency. In a normal practice, therefore, electrical conductivity is given to the above-mentioned primer, and, after a molding is coated with the same, a top coating is applied by electrostatic deposition for the purpose of coloring (e.g., Japanese Patent Application KOKAI Publication No. 1994-165966).

Plastic moldings which are used for automobile bumper or the like have usually dark color like black. Thus, when a top coating of light color or with weak hiding power is to be applied, a coating film of conductive primer as mentioned above is required to have a strong hiding power or a high-value color. In order that this requirement may be satisfied, there have been proposed conductive primers having blended therein an antimony-doped or non-antimony conductive pigment with a comparatively high value (e.g., Japanese Patent Application KOKAI Publication No. 1997-12314 and Japanese Patent Application KOKAI Publication No. 1998-53417). Antimony-doped conductive pigment has, however, a toxicity problem, and non-antimony conductive pigment is very expensive.

On the other hand, a conductive carbon black pigment which is free of toxicity problem and which is inexpensive has a problem of low value of coating film although the conductivity of coating film can be maintained. If the amount of white pigment such as titanium white is increased to enhance value, primer coating film is swollen with solvent in base coat at the time of application of base coat, and, thus, primer coating film has a high resistance.

For primer, there have been strong demands for aqueous primer to cope with recent environmental problem. As for conductive primer, there have been requests for the development of those which may form a conductive coating film having high value and good hiding power, with only a small amount of usual white pigment blended, and without expensive white conductive pigment.

DISCLOSURE OF THE INVENTION

The objective of the present invention is to provide an aqueous primer composition capable of forming a coating film which is excellent in water resistance, adhesion and the like, and which has electrical conductivity while maintaining comparatively high value, and to provide a process for coating a plastic molding with said composition.

As a result of assiduous studies, the inventors of the present invention have found out that the above-mentioned objective is achieved by blending an aqueous dispersion of a specific modified polyolefin, a resin having an ionic functional group and a pigment having conductive carbon, and have so completed the present invention.

Thus, the present invention provides an aqueous primer composition which comprises:

(A) an aqueous dispersion of modified polyolefin which comprises an unsaturated carboxylic acid- or acid anhydride-modified polyolefin (a) having a melting point of 120° C. or lower and a weight average molecular weight of 30,000 to 180,000, dispersed in an aqueous medium, (B) an ionic functional group-containing acrylic resin, and (C) a conductive carbon-containing pigment, and which forms a coating film with an L value of 35 or more and a surface resistivity of $1\times10^8$ $\Omega$/sq or less.

According to this invention, blending of aqueous dispersion of modified polyolefin (A) as specified above, an acrylic resin (B) which contains an ionic functional group, and a pigment (C) which contains conductive carbon gives an aqueous primer composition which has no problem in compatibility with other components for the primer. This aqueous primer composition is capable of forming, even on a polyolefin molding, a coating film which is excellent in water resistance, adhesion and the like, and which has electrical conductivity while maintaining value.

The aqueous primer composition of this invention is explained below in more detail.

Aqueous Dispersion of Modified Polyolefin (A):

The aqueous dispersion of modified polyolefin (A) used in this invention comprises an unsaturated carboxylic acid- or acid anhydride-modified polyolefin (a) dispersed in an aqueous medium.

In order that unsaturated carboxylic acid- or acid anhydride-modified polyolefin (a) may be obtained, a polyolefin which is produced by the (co)polymerization of at least one species of olefin which is selected from the group consisting of olefins having two to ten carbon atoms such as ethylene, propylene, butylenes and hexene is further grafted, by any known method, with an unsaturated carboxylic acid such as (meth)acrylic acid, maleic acid, fumaric acid, itaconic acid or acid anhydride thereof. In particular preferable is polyolefin grafted with maleic acid or maleic anhydride.

Although the amount of the unsaturated carboxylic acid or acid anhydride thereof for grafting is not strictly restricted but may vary according to physical properties which are required of the formed coating film. Suitable amount generally ranges from 1 to 20% by weight, preferably from 1.5 to 15% by weight, and much desirably from 2 to 10% by weight, based on the solid content of the polyolefin.

For polyolefin to be used for the above-mentioned unsaturated carboxylic acid- or acid anhydride-modified polyolefin (a), those which are produced with a single site catalyst as polymerization catalyst are preferable since thus produced polyolefins have a narrow molecular weight distribution and are excellent in random copolymerizability or the like. Single site catalysts have a uniform (single-sited) active site structure. Among such single site catalysts, metallocene-based catalysts are particularly preferable. Metallocene-based catalysts are prepared by combining a metallocene in the form of a compound which contains at least one conjugated five-member ring ligand and a transition metal compound of groups 4 to 6 or 8 of the periodic table or rare earth transition metal compound of group 3 (bis(cyclopentadienyl) metal complex and derivatives thereof) with a co-catalyst such as aluminoxane that is capable of catalyzing the metallocene and an organic aluminum compound such as trimethylaluminum.

Such a polyolefin may be produced by any known method, for instance by supplying an olefin like propylene or ethylene and hydrogen into a reaction vessel while continuously adding alkyl aluminum and metallocene.

The above-mentioned unsaturated carboxylic acid- or acid anhydride-modified polyolefin (a) may be further acrylic-modified where necessary. Examples of polymerizable unsaturated monomer to be used for said acrylic modification include alkyl esters of (meth)acrylic acid such as methyl (meth)acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, lauryl (meth)acrylate and stearyl (meth)acrylate; acrylic monomer such as (meth)acrylic acid, glycidyl (meth)acrylate, 2-hydroxyethyl (meth)acrylate, (meth)acrylamide and (meth)acrylonitrile; and styrene. These can be used either alone or in combination of two or more species.

In the present description, "(meth)acrylic" means "acrylic or methacrylic", and "(meth)acrylate" means "acrylate or methacrylate".

The above-mentioned acrylic modification can be carried out, for example, as follows: a compound, e.g., glycidyl (meth)acrylate, which is reactive with carboxyl group in unsaturated carboxylic acid- or acid anhydride-modified polyolefin (a) is firstly made to react by which to introduce a polymerizable unsaturated group, and, then, at least one species of another monomer is copolymerized with the unsaturated carboxylic acid- or acid anhydride-modified polyolefin into which a polymerizable unsaturated group has been introduced. The amount of the above-mentioned unsaturated monomer used for acrylic modification may preferably be in a range of 30% by weight or less, particularly 0.1 to 20% by weight, and more desirably 0.15 to 15% by weight, based on the solid content of the resulting modified polyolefin (a), from the viewpoint of compatibility with other components of and of the adhesion of a formed coating film.

The above-mentioned unsaturated carboxylic acid- or acid anhydride-modified polyolefin (a) may be modified, where necessary, with a compound which has a polyoxyalkylene chain from the viewpoint of water resistance, moisture resistance and gasohol resistance at the time of the formation of thick film by low-temperature baking at 90° C. or lower. Examples of polyoxyalkylene chain in a compound which has a polyoxyalkylene chain include polyoxyethylene chain, polyoxypropylene chain, and a block chain of polyoxyethylene and polyoxypropylene.

The compound which has a polyoxyalkylene chain has preferably a number average molecular weight, usually in a range of 400 to 3,000, desirably 500 to 2,000. When said number average molecular weight is less than 400, the effect as a hydrophilic group cannot be sufficiently exhibited, and, furthermore, adverse effect may be given to the performance (in particular water resistance) of coating film. When said number average molecular weight is more than 3,000, the composition is solidified at room temperature to be less handleable.

Modification with the above-mentioned compound which has a polyoxyalkylene chain is carried out, for instance, as follows: Unsaturated carboxylic acid- or acid anhydride-modified polyolefin is made to react with a compound (i) which has a hydroxyl group at a terminal and which has a polyoxyalkylene chain. Otherwise, when unsaturated carboxylic acid- or acid anhydride-modified polyolefin has been acryl-modified in the above-mentioned manner, the unsaturated carboxylic acid- or acid anhydride-modified polyolefin is made to react with a compound (ii) which has a polymerizable unsaturated group at a terminal and which has a polyoxyalkylene chain.

Examples of the above-mentioned compound (i) which has a hydroxyl group at a terminal and which has a polyoxyalkylene chain include polyoxyalkylene alkylether such as polyoxyethylene stearylether; polyoxyalkylene alkylphenylether such as polyoxyethylene nonylphenylether and polyoxyethylene dodecylphenylether; polyoxyalkylene glycol aliphatic acid ester such as polyoxyethylene aliphatic acid ester; and polyoxyalkylene alkyl amine such as polyoxyethylene alkyl amine and adduct of alkylalkanol amine with ethyleneoxide-propyleneoxide polymer. These may be used either singly or in combination of two or more species. The reaction between unsaturated carboxylic acid- or acid anhydride-modified polyolefin and compound (i) which has a hydroxyl group at a terminal and which has a polyoxyalkylene chain may be carried out, for instance as follows: Unsaturated carboxylic acid- or acid anhydride-modified polyolefin is heated at a temperature of 80 to 200° C. to be melted, and, then, compound (i) is added, and, where necessary, also a basic compound is added, and the resultant mixture is heated. On this occasion, compound (i) is preferably used in an amount of usually 0.5 to 50 parts by weight, in particular 0.5 to 25 parts by weight, based on 100 parts by weight of solid content of the unsaturated carboxylic acid- or acid anhydride-modified polyolefin.

Examples of the above-mentioned compound (ii) which has a polymerizable unsaturated group at a terminal and which has a polyoxyalkylene chain include polyethylene glycol (meth)acrylate, polypropylene glycol (meth)acrylate, polyoxyethylene methylether (meth)acrylate, polyoxypropylene methylether (meth)acrylate, polyoxyethylene laurylether (meth)acrylate, polyoxyethylene nonylphenylether (meth)acrylate, polyoxyethylene laurylether maleic acid ester and allyl group-containing polyoxyethylene nonylphenylether. These may be used either singly or in combination of two or more species. The reaction between unsaturated carboxylic acid- or acid anhydride-modified polyolefin and compound (ii) which has a polymerizable unsaturated group at a terminal and which has a polyoxyalkylene chain may be carried out, for instance as follows: Unsaturated carboxylic acid- or acid anhydride-modified polyolefin is heated at a temperature of 80 to 200° C. to be melted, and, then, a compound, e.g., glycidyl (meth)acrylate and 2-hydroxyethyl (meth)acrylate, which is reactive with carboxyl group in unsaturated carboxylic acid- or acid anhydride-modified polyolefin is added, and, where necessary, also a polymerization inhibitor, a basic compound and the like are added, and the resultant mixture is heated by which to introduce a polymerizable unsaturated group into the modified polyolefin, and, subsequently, compound (ii) is added, and, where necessary, also a polymerization initiator is added, and the resultant mixture is heated. Compound (ii) is preferably used in an amount of usually 0.5 to 50 parts by weight, in particular 0.5 to 25 parts by weight, based on 100 parts by weight of solid content of the unsaturated carboxylic acid- or acid anhydride-modified polyolefin.

The above-mentioned unsaturated carboxylic acid- or acid anhydride-modified polyolefin (a) may further be chlorinated where necessary. Polyolefin can be chlorinated by, for instance, blowing chlorine gas into an organic solvent solution or dispersion of polyolefin or modified polyolefin. Reaction temperature may be in a range of 50 to 120° C. The content of chlorine in chlorinated polyolefin (solid content) may vary according to physical properties which are required of chlorinated polyolefin. Preferably, however, it may usually be 35% by weight or less, in particular 10 to 30% by weight, more desirably 12 to 25% by weight, based on the weight of the chlorinated polyolefin, from the viewpoint of adhesion of the formed coating film.

Polyolefin which is used for the above-mentioned unsaturated carboxylic acid- or acid anhydride-modified polyolefin (a) has preferably contains especially propylene as a polymerization unit. The weight fraction of propylene in said unsaturated carboxylic acid- or acid anhydride-modified polyolefin (a) is preferably in a range of usually 0.5 to 0.99, in particular 0.7 to 0.95, from the viewpoint of compatibility with other components and of adhesion of the formed coating film.

Thus obtained unsaturated carboxylic acid- or acid anhydride-modified polyolefin (a) has a melting point of 120° C. or lower, preferably in a range of 50 to 100° C., more desirably 60 to 90° C., and has a weight average molecular weight (Mw) in a range of 30,000 to 180,000, preferably 50,000 to 150,000, more desirably 70,000 to 120,000. When the melting point and weight average molecular weight fall outside the above-mentioned ranges, the objective of this invention is not achieved; compatibility with other components, and the interlayer adhesion of the formed coating film with polyolefin substrate or with top coating film layer undesirably decline. Unsaturated carboxylic acid- or acid anhydride-modified polyolefin (a) preferably has a melting heat in a range of 1 to 50 mJ/mg, in particular 2 to 50 mJ/mg, from the viewpoint of the above-mentioned adhesion.

The above-mentioned melting point and the value of melting heat are obtained by heating 20 mg of modified polyolefin from −100° C. to 150° C. at a temperature elevation rate of 10° C./min and measuring the amount of heat with a differential scanning calorimeter DSC-5200 (trade name; Seiko Instruments Inc.). The melting point of modified polyolefin (a) can be adjusted by changing the composition of polyolefin, in particular the amount of α-olefin monomer. When it is difficult to find a value of melting heat, measurement sample is heated to 120° C., then cooled at a rate of 10° C./min, and is left to stand still for 2 days or more, and is thereafter measured for the value of heat in the above-mentioned manner.

The weight average molecular weight of the above-mentioned modified polyolefin (a) is a value obtained by the conversion, based on the weight average molecular weight of polystyrene, of weight average molecular weight as determined by gel permeation chromatography. In detail, it is a value obtained from a measurement with HLC/GPC 150C (trademark; Water Inc.; 60 cm×1) with a column temperature of 135° C., o-dichlorobenzene as a solvent and a flow rate of 1.0 ml/min. Injection sample was prepared by dissolving polyolefin in o-dichlorobenzene for 1 to 3 hours at 140° C. to a solution concentration of 5 mg of polyolefin per 3.4 ml of o-dichlorobenzene. As a column for gel permeation chromatography, $GMH_{HR}$-H(S)HT (tradename; Tosoh Corporation) can be mentioned.

Moreover, the above-mentioned unsaturated carboxylic acid- or acid anhydride-modified polyolefin (a) has preferably a ratio (Mw/Mn) of weight average molecular weight to number average molecular weight of 1.5 to 4.0, in particular 2.0 to 3.5, more desirably 2.0 to 3.0.

Aqueous dispersion (A) of modified polyolefin (a) used in this invention is obtained by dispersing the above-mentioned unsaturated carboxylic acid- or acid anhydride-modified polyolefin (a) in an aqueous medium. On this occasion, where necessary, dispersion in water can be achieved either by neutralizing all or a part of the carboxyl groups in the unsaturated carboxylic acid- or acid anhydride-modified polyolefin (a) with an amine compound, or by using an emulsifier. When the modified polyolefin (a) has a polyoxyalkylene chain, it can be dispersed in an aqueous medium either with no such amine compound or emulsifier at all, or with only a small amount thereof.

Examples of amines used for neutralization include tertiary amines such as triethylamine, tributylamine, dimethylethanolamine or triethanolamine; secondary amines such as diethylamine, dibutylamine, diethanolamine or morpholine; and primary amines such as propylamine or ethanolamine. The amount of these amine compounds, when used, are usually in a range of 0.1 to 1.0 molar equivalent with respect to carboxyl groups in the unsaturated carboxylic acid- or acid anhydride-modified polyolefin (a).

Examples of the above-mentioned emulsifier include nonionic emulsifier such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate or polyoxyethylene sorbitan monolaurate; and anionic emulsifier such as sodium salts or ammonium salts of alkyl sulfonic acid, alkylbenzene sulfonic acid or alkyl phosphoric acid. Also usable are polyoxyalkylene group-containing anionic emulsifier having, in a molecule, both an anionic group and a polyoxyalkylene group such as polyoxyethylene group and polyoxypropylene group, and reactive anionic emulsifiers having said anionic group and polymerizable unsaturated group in a molecule. These emulsifiers can each be used either alone or in combination of two or more species.

The above-mentioned emulsifier is preferably used in an amount of 30 parts by weight or less, in particular in a range of 0.5 to 25 parts by weight, per 100 parts by weight of the solid content of the unsaturated carboxylic acid- or acid anhydride-modified polyolefin (a).

Ionic Functional Group-Containing Acrylic Resin (B):

For the ionic functional group-containing acrylic resin (B) in this invention, any known acrylic resin can be used without particular restriction so long as it has an ionic functional group. It is especially preferable that the ionic functional group is at least one species of group selected from tertiary amino group, quaternary ammonium base, sulfonic acid group, phosphoric acid group and carboxylate group which has quaternary ammonium salt as a counter ion. Acrylic resin (B) preferably acts as a pigment-dispersing resin at the time of dispersion of conductive carbon-containing pigment (C) as mentioned later.

Acrylic resin (B) as mentioned above can usually be obtained by copolymerization of ionic functional group-containing polymerizable unsaturated monomer and other ethylenically unsaturated monomer. Thus obtained acrylic resin (B) has ionic functional group-containing polymerizable unsaturated monomer unit preferably in an amount ranging from 1 to 40 mole %, in particular from 3 to 20 mole %.

Examples of ionic functional group-containing polymerizable unsaturated monomer include tertiary amino group-containing polymerizable unsaturated monomer such as N,N-dimethylaminoethyl (meth)acrylate, N,N-diethylaminoethyl (meth)acrylate, N,N-dimethylaminopropyl (meth)acrylate, N,N-di t-butylaminoethyl (meth)acrylate and N,N-dimethylaminobutyl (meth)acrylate; quaternary ammonium base-containing polymerizable unsaturated monomer such as (meth)acryloyloxy alkyltrialkyl ammonium salt like 2-(meth-acryloyloxy)ethyltrimethyl ammonium chloride, 2-(meth-acryloyloxy)ethyltrimethyl ammonium bromide and 2-(methacryloyloxy)ethyltrimethyl ammonium dimethylphosphate; (meth)acryloylamino alkyltrialkyl ammonium salt like methacryloylamino propyltrimethyl ammonium chloride and methacryloylamino propyltrimethyl ammonium bromide; tetraalkyl (meth)acrylate like tetrabutylammonium (meth)acrylate; and trialkylbenzylammonium (meth)acrylate like trimethylbenzylammonium (meth)acrylate; sulfonic acid group-containing polymerizable unsaturated monomer such as (meth)acrylamide-alkane sulfonic acid like 2-acrylamide-2-methylpropane sulfonic acid; and sulfoalkyl (meth)acrylate like 2-sulfoethyl (meth)acrylate; phosphoric acid group-containing polymerizable unsaturated monomer such as 2-methacryloyloxyethyl acid phosphate, 2-allyloyloxyethyl acid phosphate, a polymerizable unsaturated monomer which is obtained by adding glycidyl methacrylate to monoalkyl (e.g., butyl, decyl, lauryl and stearyl) phosphoric acid, and a polymerizable unsaturated monomer which is obtained by adding glycidyl methacrylate to benzylphosphoric acid; and quaternized carboxyl group-containing polymerizable unsaturated monomer. These monomers may be used either singly or in combination of two or more species.

Said other ethylenically unsaturated monomer is a polymerizable unsaturated monomer other than the above-mentioned ones which is copolymerizable with the above-mentioned ones. Any known ethylenically unsaturated monomer can be chosen for use according to special properties which are required of acrylic resin (B). Examples of said other ethylenically unsaturated monomer include $C_1$-$C_{24}$ straight chain or cyclic alkyl (meth)acrylate monomer such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, n-octyl (meth)acrylate, lauryl (meth)acrylate, stearyl (meth)acrylate, cyclohexyl (meth)acrylate, isobornyl (meth)acrylate and tridecyl (meth)acrylate; hydroxyl group-containing polymerizable unsaturated monomer such as 2-hydroxyethyl (meth)acrylate, hydroxypropyl (meth)acrylate and hydroxybutyl (meth)acrylate; carboxyl group-containing polymerizable unsaturated monomer such as methacrylic acid and acrylic acid; acrylamide and methacrylamide; oxetane ring-containing (meth)acrylate such as 3-ethyl-3-(meth)acryloyloxymethyl oxetane, 3-methyl-3-(meth)acryloyloxymethyl oxetane and 3-butyl-3-(meth)acryloyloxymethyl oxetane; aromatic vinyl compound such as styrene, α-methyl styrene and vinyl toluene; (meth)acrylonitrile and vinyl acetate. These polymerizable unsaturated monomers may be used either singly or in combination of two or more species.

In this invention, ionic functional group-containing acrylic resin (B) preferably further contains polyoxyalkylene chain from the viewpoint of water dispersibility and electrical conductivity. The introduction of said polyoxyalkylene chain can be carried out, for instance as follows: At the time of the production of acrylic resin (B), a polymerizable unsaturated monomer having a polyoxyalkylene chain is copolymerized with the above-mentioned ionic functional group-containing polymerizable unsaturated monomer and other ethylenically unsaturated monomer.

Examples of the above-mentioned polymerizable unsaturated monomer having a polyoxyalkylene chain include tetraethylene glycol (meth)acrylate, methoxy tetraethylene glycol (meth)acrylate, ethoxy tetraethylene glycol (meth)acrylate, n-butoxy tetraethylene glycol (meth)acrylate, tetrapropylene glycol (meth)acrylate, methoxy tetrapropylene glycol (meth)acrylate, ethoxy tetrapropylene glycol (meth)acrylate, n-butoxy tetrapropylene glycol (meth)acrylate, polyethylene glycol (meth)acrylate, polypropylene glycol (meth)acrylate, methoxy polyethylene glycol (meth)acrylate and ethoxy polyethylene glycol (meth)acrylate. Among these, polyethylene glycol (meth)acrylate and polypropylene glycol (meth)acrylate are preferable. These can be used either singly or in combination of two or more species.

From the viewpoint of pigment dispersibility and electrical conductivity, ionic functional group-containing polymerizable unsaturated monomer, polymerizable unsaturated monomer having polyoxyalkylene chain and other ethylenically unsaturated monomer are used in the production of acrylic resin (B) in the following proportion: Ionic functional group-containing polymerizable unsaturated monomer usually accounts for 0.5 to 20% by weight, preferably 1 to 15% by weight; polymerizable unsaturated monomer having polyoxyalkylene chain usually accounts for 10 to 30% by weight, preferably 15 to 25% by weight; and other ethylenically unsaturated monomer usually accounts for 50 to 89.5% by weight, preferably 60 to 84% by weight.

The copolymerization of these monomers is carried out by any known method, e.g., solution polymerization in organic solvent and emulsion polymerization in water, among which solution polymerization is suitable.

Acrylic resin (B) has preferably a weight average molecular weight in a range of about 5,000 to 300,000, desirably 7,500 to 150,000, more desirably 10,000 to 50,000. Said weight average molecular weight of acrylic resin is a value obtained by converting weight average molecular weight as determined by gel permeation chromatography using tetrahydrofuran as solvent, based on the
weight average molecular weight of polystyrene.
HLC8120GPC (trademark; Tosoh Corporation) can be used as an apparatus for gel permeation chromatography. As column for gel permeation chromatography, four of TSKgel G-4000HxL, TSKgel
G-3000HxL, TSKgel G-2500HxL and TSKgel G-2000HxL (trade marks; each manufactured by Tosoh Corporation) can be used.

Acrylic resin (B) may optionally be neutralized with a neutralizer to be water soluble or water dispersible.

In this invention, from the viewpoint of the adhesion, water resistance and electrical conductivity of the formed coating film, aqueous dispersion (A) and acrylic resin (B) are each used in an amount such that aqueous dispersion (A) accounts for 20 to 90% by weight, in particular 30 to 70% by weight, more desirably 30 to 60% by weight, and that acrylic resin (B) accounts for 0.5 to 50% by weight, preferably 1 to 30% by weight, more desirably 5 to 30% by weight, based on the solid content of total resin in the composition.

Pigment (C):

Pigment (C) used in this invention contains at least conductive carbon. Other than conductive carbon, known pigments which are usually employed in the field of coating, e.g., coloring pigment, extender pigment and conductive pigment are included.

Examples of the above-mentioned conductive carbon include conductive carbon black, carbon nanotube, carbon nanofiber and carbon microcoil. From the viewpoint of value and conductivity, said conductive carbon has preferably a specific surface area of 600 $m^2/g$ or more, in particular 800 $m^2/g$ or more, more desirably 1000 $m^2/g$ or more.

Examples of the above-mentioned coloring pigment include titanium dioxide, red iron oxide, aluminum paste, azo-based pigment and phthalocyanine-based pigment. Examples of extender pigment include talc, silica, calcium carbonate, barium sulfate and zinc white (zinc oxide). These pigments may be used either singly or in combination of two or more species.

For the above-mentioned conductive pigment, any can be used without limitation so long as it is capable of imparting electrical conductivity to the formed coating film. As for the shape of said conductive pigment, any of particle-like, flake-like or fiber-like (including whisker-like) shape will do. Examples of conductive pigment include metal powders of silver, nickel, copper, graphite or aluminum, and, furthermore, antimony-doped tin oxide, phosphorous-doped tin oxide, needle-like titanium oxide whose surface is coated with tin oxide/antimony, antimony oxide, zinc antimonate, indium tin oxide, whisker of carbon or graphite whose surface is coated with tin oxide; flake-like mica whose surface is coated with at least one conductive metal oxide selected from the group consisting of tin oxide, antimony-doped tin oxide, tin-doped indium oxide (ITO), fluorine-doped tin oxide (FTO), phosphorous-doped tin oxide and nickel oxide; and electrically conductive pigment comprising titanium oxide particles whose surface contains tin oxide and phosphorous. These may be used either singly or in combination of two or more species.

When the composition of this invention is especially intended to be used to form a coating film which has high L value, pigment (C) desirably contains white pigment, in particular titanium oxide. From the viewpoint of decorativeness, chemical resistance and the like, pigment (C) has preferably an average particle diameter in a range of about 0.05 to about 2 μm, in particular 0.1 to 1 μm.

From the viewpoint of adhesion and water resistance of the formed coating film, pigment (C) is preferably used in an amount ranging from 0.5 to 200 parts by weight, in particular 1 to 150 parts by weight, more desirably 5 to 150 parts by weight, based on 100 parts by weight of solid content of total resin in the composition. The amount of conductive carbon in pigment (C) is preferably determined in consideration of value and conductivity of the formed coating film. Thus, conductive carbon is used in an amount usually ranging from 0.5 to 30 parts by weight, in particular 1 to 20 parts by weight, more desirably 3 to 20 parts by weight, per 100 parts by weight of solid content of total resin in the composition. Furthermore, when the above-mentioned white pigment is used, the content of the same is preferably determined so that L value of the coating film may be 35 or more. Thus, white pigment is used in an amount usually ranging from 50 to 150 parts by weight, desirably 70 to 130 parts by weight, more desirably 70 to 120 parts by weight, per 100 parts by weight of solid content of total resin in the composition.

Aqueous Primer Composition:

The aqueous primer composition of this invention can be prepared by mixing the above-mentioned aqueous dispersion (A) of modified polyolefin (a), ionic functional group-containing resin (B) and conductive carbon-containing pigment (C) by a normal method, and diluting the resulting mixture with a suitable aqueous medium such as deionized water.

Where necessary, the aqueous primer composition of this invention may further contain urethane resin as a vehicle component. Said urethane resin is a water-soluble or water-dispersible resin which has urethane bond in molecule, and may be in the form of self-emulsifying emulsion having an acid value, emulsion in combination with emulsifier or in the form of water-soluble resin. In particular preferable is urethane resin in the form of dispersion. Urethane dispersion is a dispersion which is usually obtained as follows: Diol and diisocyante, and optionally dimethylol alkanoic acid etc. as well, are preliminarily made to react in the presence of an emulsifier to give urethane prepolymer. This urethane prepolymer is forcibly emulsified or self-emulsified while being dispersed in water, thereby to give urethane dispersion.

The skeleton of the above-mentioned urethane resin may comprise ether resin, carbonate resin or ester resin, among which ether resin skeleton and carbonate resin skeleton are preferable from the viewpoint of water resistance or the like of the formed coating film. Urethane resin may also comprise hydroxyl group.

The urethane resin is preferably blended in an amount of 50% by weight or less, in particular 10 to 40% by weight, more desirably 15 to 40% by weight, based on the solid content of total resin in the composition, from the viewpoint of the improvement of physical properties of coating film.

The aqueous primer composition of this invention may further contain, where necessary, water-soluble or water-dispersible resin other than the above-mentioned urethane resin. Examples of said water-soluble or water-dispersible resin include self-crosslinking resin such as acrylic resin other than acrylic resin (B), polyester resin or grafted resin thereof, acryl-modified or polyester-modified epoxy resin, and blocked isocyanate group-containing polyester resin. In particular suitable are water-soluble or water-dispersible acrylic resin and water-soluble or water-dispersible polyester resin.

As the above-mentioned water-soluble or water-dispersible acrylic resin, there can be mentioned water-soluble acrylic resin having a weight average molecular weight of 5,000 to 100,000 or acrylic resin emulsion having a weight average molecular weight of 50,000 or more, which are usually obtained by the copolymerization of a monomer mixture which comprises hydrophilic group-containing polymerizable unsaturated monomer such as carboxyl group-containing polymerizable unsaturated monomer and other polymerizable unsaturated monomer. Said weight average molecular weight can be measured by the same manner as in the weight average molecular weight of acrylic resin (B).

Examples of said carboxyl group-containing polymerizable unsaturated monomer include (meth)acrylic acid, crotonic acid, maleic acid, fumaric acid, itaconic acid and half monoalkyl esterified compound of dicarboxylic acid among those mentioned above. Examples of hydrophilic group-containing polymerizable unsaturated monomer other than the above include polyalkylene chain-containing polymerizable unsaturated monomer such as polyethylene glycol (meth)acrylate and polypropylene glycol (meth)acrylate.

Examples of said other polymerizable unsaturated monomer include $C_1$-$C_{24}$ alkyl or cycloalkyl ester of (meth)acrylic acid such as methyl (meth)acrylate, ethyl (meth)acrylate, n-, i-propyl (meth)acrylate, n-, i-, t-butyl (meth)acrylate, 2-ethylhexyl (meth)acrylate, cyclohexyl (meth)acrylate, lauryl (meth)acrylate, isobornyl (meth)acrylate; hydroxyl alkylester of (meth)acrylic acid such as 2-hydroxyethyl (meth)acrylate, 2- or 3-hydroxypropyl (meth)acrylate and 4-hydroxybutyl (meth)acrylate; glycidyl (meth)acrylate, acrylonitrile, acrylamide, styrene, vinyl toluene, vinyl acetate, vinyl chloride and 1,6-hexanediol diacrylate. These polymerizable unsaturated monomers may be used either singly or in combination of two or more species.

The copolymerization of the above-mentioned monomer mixture is carried out by any known method. For instance, water-soluble acrylic resin is obtained by solution polymerization or the like, and acrylic resin emulsion is obtained by emulsion polymerization or the like.

When acrylic resin emulsion which is obtained by emulsion polymerization is to be employed for the above-mentioned water-soluble or water-dispersible acrylic resin, it may also be a multi-layer particulate emulsion which is produced by multi-stage emulsion polymerization of monomer mixture in the presence of water and emulsifier.

Carboxyl group of the above-mentioned water-soluble or water-dispersible acrylic resin may optionally be neutralized with basic substance. Examples of basic substance include ammonia, methylamine, ethylamine, propylamine, butylamine, dimethylamine, trimethylamine, triethylamine, ethylene diamine, morpholine, methylethanolamine, dimethylethanolamine, diethanolamine, triethanolamine, diisopropanolamine and 2-amino-2-methylpropanol. These may be used either singly or in combination of two or more species.

Water-soluble or water-dispersible polyester resin can be obtained by neutralizing oil-free or oil-modified polyester resin which is produced by esterification reaction of polyhydric alcohol and polybasic acid, and optionally monobasic acid and oil component (including aliphatic acid thereof) as well. Said polyester resin has preferably a weight average molecular weight in a range of about 3,000 to 100,000, desirably 4,000 to 65,000, more desirably 5,000 to 30,000. The weight average molecular weight of polyester resin can be measured in the same manner as in the weight average molecular weight of the above-mentioned acrylic resin.

Examples of the above-mentioned polyhydric alcohol include ethylene glycol, propylene glycol, butane diol, pentane diol, hexane diol, 2,2-dimethyl propane diol, glycerin, trimethylol propane, pentaerythritol, adduct of bisphenol compound with ethylene oxide and adduct of bisphenol compound with propylene oxide. These may be used either singly or in combination of two or more species. Examples of the above-mentioned polybasic acid include phthalic acid, isophthalic acid, tetrahydro phthalic acid, hexahydro phthalic acid, maleic acid, succinic acid, adipic acid, sebacic acid, trimellitic acid, pyromellitic acid, and anhydride thereof. These may be used either singly or in combination of two or more species. Examples of monobasic acid include benzoic acid and t-butyl benzoic acid. Examples of oil component include castor oil, dehydrated castor oil, safflower oil, soy bean oil, linseed oil, tall oil, palm oil and aliphatic acid thereof. These may be used either singly or in combination of two or more species.

Into the above-mentioned polyester resin, carboxyl group can easily be introduced by combined use of polybasic acid such as trimellitic acid and pyromellitic acid which has three or more carboxyl groups in a molecule, or by half ester addition of dicarboxylic acid; hydroxyl group can be introduced, for instance by combined use of polyhydric alcohol such as glycerin and trimethylol propane which has three or more hydroxyl groups in a molecule.

Carboxyl group of the above-mentioned polyester resin may be neutralized with basic substance as set forth above.

The above-mentioned water-soluble or water-dispersible acrylic resin and water-soluble or water-dispersible polyester resin have preferably a hydroxyl group, and have, from the viewpoint of water solubility, compatibility with other components and of the curability of the formed coating film, a hydroxyl value of 20 to 200 mg KOH/g, desirably 20 to 150 mg KOH/g, and an acid value of 1 to 100 mg KOH/g, desirably 10 to 70 mg KOH/g.

The above-mentioned water-soluble or water-dispersible acrylic resin and water-soluble or water-dispersible polyester resin is preferably blended in an amount of 50% by weight or less, in particular in a range of 5 to 40% by weight, based on the solid content of total resin of the composition, from the viewpoint of improvement of physical properties of coating film.

The aqueous primer composition of this invention may further contain a crosslinking agent where necessary. As said crosslinking agent, there can usually be employed amino resin and/or (blocked) which are reactive with hydroxyl groups in the above-mentioned acrylic resin (B), urethane resin, water-soluble or water-dispersible acrylic resin and water-soluble or water-dispersible polyester resin. Also usable as crosslinking agent is epoxy compound which is reactive with carboxyl groups in aqueous dispersion (A) of modified polyolefin (a).

Examples of the above-mentioned amino resin include melamine resin, urea resin and benzoguanine resin, among which
melamine resin is preferable. Examples of preferable melamine resin include alkyl-etherified melamine resin which has been etherified with an alkyl group such as methyl, ethyl, n-butyl, isobutyl, hexyl or 2-ethylhexyl. Such an alkyl-etherified melamine resin may be either of hydrophobic or hydrophilic type. These melamine resins may further have methylol or imino group. Amino resin preferably has a number average molecular weight usually in a range of 500 to 5,000, in particular 800 to 3,000. Said number average molecular weight of the amino resin is a value obtained by converting weight average molecular weight as measured by gel permeation chromatography using tetrahydrofuran as solvent and at a flow rate of 1.0 ml/min, based on the weight average molecular weight of polystyrene. HLC8120GPC (trademark, Tosoh Corporation) can be used as a gel permeation chromatography apparatus. As for column, TSKgel G-4000HxL, TSKgel G-3000HxL, TSKgel G-2500HxL or TSKgel G-2000HxL (each of which is trademark, Tosoh Corporation) can be employed.

The above-mentioned (blocked) polyisocyanate is obtained by blocking either a polyisocyanate compound having two or more free isocyanate groups in a molecule or isocyanate groups thereof with a blocking agent.

Examples of the above-mentioned polyisocyanate compound include aliphatic polyisocyanates such as hexamethylene diisocyanate, trimethylhexamethylene diisocyanate, dimer acid diisocyanate and lysine diisocyanate; biuret type addition product and isocyanurate ring addition product of these aliphatic polyisocyanates; alicyclic diisocyanates such as isophorone diisocyanate, 4,4'-methylenebis(cyclohexylisocyanate), methylcyclohexane-2,4- or -2,6-diisocyanate, 1,3- or 1,4-di(isocyanatomethyl)cyclohexane, 1,4-cyclohexane diisocyanate, 1,3-cyclopentane diisocyanate and 1,2-cyclohexane diisocyanate; biuret type addition product and isocyanurate ring addition product of these alicyclic diisocyanates; aromatic diisocyanate compound such as xylylene diisocyanate, tetramethylxylylene diisocyanate, tolylene diisocyanate, 4,4'-diphenylmethane diisocyanate (MDI), 1,5-naphthalene diisocyanate, 1,4-naphthalene diisocyanate, 4,4'-toluidine diisocyanate, 4,4'-diphenylether diisocyanate, (m- or p-) phenylene diisocyanate, 4,4'-biphenylene diisocyanate, 3,3'-dimethyl-4,4'-biphenylene diisocyanate, bis(4-isocyanatophenyl) sulfone or isopropylidene bis(4-phenylisocyanate); biuret type addition product and isocyanurate ring addition product of these aromatic diisocyanates; hydrogenated MDI and derivatives thereof; polyisocyanates having three or more isocyanate groups in a molecule such as triphenylmethane-4,4',4"-triisocyanate, 1,3,5-triisocyantobenzene, 2,4,6-triisocyanatotoluene and 4,4'-dimethyldiphenylmethane-2,2',5,5'-tetraisocyanate; biuret type addition product and isocyanurate ring addition product of these polyisocyanates; urethanation addition product obtained by reacting a polyisocyanate compound with a polyol at a ratio such that isocyanate groups are in excess with respect to hydroxyl groups of the polyol which is exemplified by ethylene glycol, propylene glycol, 1,4-butylene glycol, dimethylol propionic acid, polyalkylene glycol, trimethylol propane and hexanetriol; and biuret type addition product and isocyanurate ring addition product of these urethanation addition products.

Blocked polyisocyanate is obtained by adding a blocking agent to isocyanate group of the above-mentioned polyisocyanate compounds. It is desirable that blocked polyisocyanate compounds as formed from this addition are stable at room temperature, but, when heated to the baking temperature of coating film (normally about 90 to about 200° C.), regenerate free isocyanate groups by the dissociation of blocking agent. Examples of blocking agent that satisfies such requirements include phenol-based blocking agent such as phenol, cresol, xylenol, nitrophenol, ethylphenol, hydroxydiphenyl, butyl phenol, isopropyl phenol, nonyl phenol, octyl phenol and methyl hydroxybenzoate; lactam-based blocking agent such as ε-caprolactam, δ-valerolactam, γ-butyrolactam and β-propiolactam; aliphatic alcohol-based blocking agent such as methanol, ethanol, propyl alcohol, butyl alcohol, amyl alcohol and lauryl alcohol; ether-based blocking agent such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether and methoxymethanol; benzyl alcohol; glycolic acid; glycolic acid ester-based blocking agent such as methyl glycolate, ethyl glycolate and butyl glycolate; lactic acid ester-based blocking agent such as lactic acid, methyl lactate, ethyl lactate and butyl lactate; alcohol-based blocking agent such as methylol urea, methylol melamine, diacetone alcohol, 2-hydroxyethyl acrylate and 2-hydroxyethyl methacrylate; oxime-based blocking agent such as formamidoxime, acetamidoxime, acetoxime, methyl ethyl ketoxime, diacetyl monoxime, benzophenone oxime or cyclohexane oxime; active methylene-based blocking agent such as malonic acid dialkyl ester like dimethyl malonate, diethyl malonate, diisopropyl malonate, di-n-butyl malonate, diethyl methyl malonate, benzyl methyl malonate and diphenyl malonate, acetoacetic acid ester like methyl acetoacetate, ethyl acetoacetate, isopropyl acetoacetate, n-propyl acetoacetate, benzyl acetoacetate and phenyl acetoacetate, and acetyl acetone; mercaptan-based blocking agent such as butyl mercaptan, t-butyl mercaptan, hexyl mercaptan, t-dodecyl mercaptan, 2-mercaptobenzothiazole, thiophenol, methyl thiophenol and ethyl thiophenol; acid amide-based blocking agent such as acetanilide, acetanisidide, acetotoluide, acrylamide, methacrylamide, acetic acid amide, stearic acid amide and benzamide; imide-based blocking agent such as succinimide, phthalimide and maleimide; amine-based blocking agent such as diphenylamine, phenylnaphthylamine, xylidine, N-phenylxylidine, carbazole, aniline, naphthylamine, butylamine, dibutylamine and butylphenylamine; imidazole-based blocking agent such as imidazole and 2-ethylimidazole; pyrazole-based blocking agent such as 3,5-dimethylpyrazole; urea-based blocking agent such as urea, thiourea, ethylene urea, ethylene thiourea and diphenyl urea; carbamic acid ester-based blocking agent such as phenyl N-phenylcarbamate; imine-based blocking agent such as ethyleneimine and propyleneimine; and bisulfite-based blocking agent such as sodium bisulfite and potassium bisulfite. Preferable among these is polyisocyanate blocked with active methylene-based blocking agent from the viewpoint of low-temperature curability and compatibility with aqueous dispersion (A) of modified polyolefin (a) and with acrylic resin (B).

The above-mentioned blocked polyisocyanate may optionally be one to which water dispersibility has been given. Blocked polyisocyanate to which water dispersibility has been given include those which are prepared by blocking isocyanate groups of a polyisocyanate compound with a hydroxymonocarboxylic acid-containing blocking agent, and then neutralizing carboxyl groups which have been introduced by the hydroxymonocarboxylic acid, thereby giving water dispersibility, and those which have been rendered water-dispersible by the addition or reaction of surfactant.

For the above-mentioned epoxy compound, there are no particular limitations, and any known one can be employed so long as it has at least two epoxy groups in a molecule. Examples of such epoxy compound include bisphenol epoxy resin, novolak epoxy resin and polyethylene glycol diglycidyl ether. Said epoxy compound may optionally be rendered water-dispersible before use.

The use of the above-mentioned epoxy compound as a crosslinking agent is in particular preferable since it achieves good moisture resistance even in low-temperature baking at 90° C. or lower when ionic functional group-containing acrylic resin (B) has a tertiary amino group.

In consideration of compatibility with aqueous dispersion (A) of modified polyolefin (a) and with ionic functional group-containing acrylic resin (B) and also of the curability, adhesion and water resistance of the formed coating film, the content of the above-mentioned crosslinking agent may generally be 40% by weight or less, in particular in a range of 3 to 30% by weight, more desirably 5 to 20% by weight, per 100 parts by weight of the solid content of total resin of the composition.

From the viewpoint of compatibility with paint, the aqueous primer composition of this invention may further contain a terpene resin. Examples of terpene resin include hydrogenation products of terpene, terpene-phenol and aromatic modified terpene resin. Said terpene resin preferably has a melting point generally in a range of 30 to 120° C. The melting point of terpene resin can be measured in the same manner as in the above-mentioned polyolefin (a). Moreover, terpene resin is desirably used usually in an amount of 30% by weight or less, preferably in a range of 5 to 20% by weight, based on the solid content of total resin in the composition.

The aqueous primer composition of this invention may optionally further contain paint additives such as curing catalyst, rheology controlling agent, anti-foaming agent and organic solvent.

Application:

The aqueous primer composition of this invention is to be applied to the surface of molding which is required to have electrical conductivity. Thus, although there is no particular restriction, plastic molding is in particular suitable as a substrate for the aqueous primer composition, from the viewpoint of electrical conductivity.

Examples of plastic molding include those used for automobile exterior panel such as bumper, spoiler, grille and fender; and for exterior plate of home appliances. In particular preferable as a material for such plastic molding is polyolefin which is obtained by (co)polymerization of one or more types of olefins having 2 to 10 carbon atoms such as ethylene, propylene, butylene and hexane. Also suitable for the aqueous primer composition of this invention are polycarbonate, ABS plastic, urethane resin, polyamide, and the like.

These plastic moldings may be previously subjected to degreasing treatment or water-washing treatment by any known method prior to the application of the primer composition of this invention.

The primer composition of this invention is applied to substrate to the dry film thickness usually in a range of 1 to 30 µm, preferably 5 to 15 µm, by, for example, air spraying, air-less spraying, dipping or brushing. After the application of said aqueous primer composition, the resulting coating film surface can be cured, optionally by setting for 1 to 60 minutes at room temperature or preheating for 1 to 60 minutes at a temperature of about 40 to 80° C., or by heating for about 20 to 40 minutes at a temperature of about 60 to about 140° C., preferably about 70 to about 120° C.

Thus formed coating film can have a surface resistivity of $1 \times 10^8$ Ω/sq or less, which, as an electrically conductive primer coating film, enables good electrostatic deposition at the next step.

"Surface resistivity" in this specification is measured as follows: A coating film which has been formed to have a dry film thickness of about 5 to 15 µm is dried under a condition of 80° C. for 10 minutes, and is then measured by TREK MODEL 150, trademark of a Trek's surface resistance meter manufactured by TREK, INC. (unit: Ω/sq).

A coating film formed from the aqueous primer composition of this invention may have an L value of 35 or more, preferably in a range of 40 to 80, more desirably 40 to 75.

L value is obtained as follows: The aqueous primer composition of this invention is applied onto a plastic plate to such a film thickness as to give hiding power (usually a thickness of 5 to 15 µm in dried film), and is then cured by baking. Thus formed coating film is measured by Color Computer SM-7 (trademark of the product manufactured by Suga Test Instruments Co., Ltd.) for L value by CIE1976 color system. The larger L value is, the higher is white color degree.

A top coating may be applied to the surface of a plastic molding which has been coated with an aqueous primer composition of this invention in the above-mentioned manner. As a top coating, a colored paint may singly be applied. Otherwise, a colored paint may be used as a base paint, and, thus, said base paint and a clear paint may be applied in order.

Usable colored base paint as mentioned above usually has an organic solvent and/or water as a primary solvent, and mainly comprises a coloring component such as coloring pigment, glitter and dyestuff, and a resin component such as base resin and crosslinking agent.

Examples of base resin to be used for the colored base paint as mentioned above include acrylic resin, polyester resin and alkyd resin having a crosslinking functional group such as hydroxyl group, epoxy group, carboxyl group and silanol group. Examples of crosslinking agent include amino resin such as melamine resin and urea resin, (blocked) polyisocyanate, polyepoxide and polycarboxylic acid which are reactive with said functional groups.

The above-mentioned colored base paint may optionally further contain paint additives such as extender pigment, curing catalyst, UV light absorber, surface conditioner, rheology controller, antioxidant, antifoaming agent, wax and antiseptic.

The above-mentioned colored base paint is usually applied by electrostatic deposition to a dry film thickness in a range of 5 to 50 µm, preferably 10 to 20 µm. The surface of thus obtained coating film may optionally be subjected to setting for 1 to 60 minutes at room temperature, or to preheating for 1 to 60 minutes at a temperature of about 40 to 80° C., or, otherwise, may be heated for about 20 to 40 minutes at a temperature of about 60 to 140° C., preferably about 80 to 120° C., to be cured.

The above-mentioned clear paint is an organic solvent-based or aqueous thermosetting paint which usually comprises mainly a resin component such as base resin and crosslinking agent, and an organic solvent or water, and optionally paint additives such as UV light absorber, light stabilizer, curing catalyst, surface conditioner, rheology controller, antioxidant, antifoaming agent and wax, and which has such a degree of transparency that sublayer coating film is visible through coating film of the clear paint.

Examples of the above-mentioned base resin include acrylic resin, polyester resin, alkyd resin, fluoroplastic, urethane resin and silicon-containing resin which comprise at least one species of crosslinking functional group such as hydroxyl group, carboxyl group, silanol group and epoxy group. In particular suitable is hydroxyl group-containing acrylic resin. Examples of crosslinking agent include melamine resin, urea resin, (blocked) polyisocyanate compound, epoxy compound, carboxyl group-containing compound, acid anhydride and alkoxysilane group-containing compound which are reactive with functional groups as recited above. In particular suitable is blocked isocyanate compound.

The above-mentioned clear paint is usually applied by electrostatic deposition to a dry film thickness in a range of 10 to 50 µm, preferably 20 to 40 µm. Thus obtained coating film may optionally be subjected to setting for 1 to 60 minutes at room temperature, or to preheating for 1 to 60 minutes at a temperature of about 40 to 80° C., before heated for about 20 to 40 minutes at a temperature of about 60 to 140° C., preferably about 70 to 120° C., to be cured.

EXAMPLES

This invention is further explained in more detail by the following Examples. Incidentally, "parts" and "%" mean "parts by weight" and "% by weight" unless otherwise indicated.

Production of Ionic Functional Group-Containing Resin (B-1)

An ordinary reaction vessel for producing acrylic resin which was equipped with stirrer, thermometer and reflux condenser was charged with 35 parts of ethylene glycol monobutyl ether, which was then heated under stirring, and maintained at 110° C. Into reaction vessel, a mixture of 10 parts of styrene, 40 parts of methyl methacrylate, 25 parts of n-butyl methacrylate, 10 parts of 2-hydroxyethyl methacrylate, 3 parts of methacrylic acid, 5 parts of 2-acrylamide-2-methylsulfonic acid (solid content; dissolved in 10 parts of deionized water and blended), 10 parts of NF BISOMER PEM6E (trademark of polyethylene glycol monomethacrylate having a molecular weight of about 350, manufactured by Dai-ichi Kogyo Seiyaku Co., Ltd.), 4 parts of azobisisobutyronitrile and 20 parts of isobutyl alcohol was fed dropwise over a period of 3 hours. The resultant mixture was matured at 110° C. for 30 minutes. Then an additional catalytic mixture of 15 parts of ethylene glycol monobutyl ether and 0.5 part of azobisisobutyronitrile was added dropwise over a period of one hour. The resultant mixture was matured at 110° C. for one hour, and was then cooled, and, thus, a solution of ionic functional group-containing resin (B-1) having a solids content of 55% was obtained. This resin (B-1) had a hydroxyl value of 43 mg KOH/g and a weight average molecular weight of about 20,000.

Production of Ionic Functional Group-Containing Resin (B-2)

An ordinary reaction vessel for producing acrylic resin which was equipped with stirrer, thermometer and reflux condenser was charged with 45 parts of ethylene glycol monobutyl ether, which was then heated under stirring, and maintained at 110° C. Into reaction vessel, a mixture of 10 parts of styrene, 40 parts of methyl methacrylate, 25 parts of n-butyl methacrylate, 10 parts of 2-hydroxyethyl methacrylate, 3 parts of methacrylic acid, 7 parts of 2-(methacryloyloxy)ethyltrimethyl ammonium chloride, 5 parts of NF BISOMER PEM6E (trademark of polyethylene glycol monomethacrylate having a molecular weight of about 350, manufactured by Dai-ichi Kogyo Seiyaku Co., Ltd.), 4 parts of azobisisobutyronitrile and 15 parts of isobutyl alcohol was fed dropwise over a period of 3 hours. The resultant mixture was matured at 110° C. for 30 minutes. Then an additional catalytic mixture of 20 parts of ethylene glycol monobutyl ether and 0.5 part of azobisisobutyronitrile was added dropwise over a period of one hour. The resultant mixture was matured at 110° C. for one hour, and was then cooled, and, thus, a solution of ionic functional group-containing resin (B-2) having a solids content of 55% was obtained. This resin (B-2) had a hydroxyl value of 43 mg KOH/g and a weight average molecular weight of about 20,000.

Production of Ionic Functional Group-Containing Resin (B-3)

An ordinary reaction vessel for producing acrylic resin which was equipped with stirrer, thermometer and reflux condenser was charged with 35 parts of ethylene glycol monobutyl ether, which was then heated under stirring, and maintained at 110° C. Into reaction vessel, a mixture of 10 parts of styrene, 40 parts of methyl methacrylate, 25 parts of n-butyl methacrylate, 10 parts of 2-hydroxyethyl methacrylate, 3 parts of methacrylic acid, 5 parts of N,N-dimethylaminoethyl methacrylate (solid content; dissolved in 10 parts of deionized water and blended), 10 parts of NF BISOMER PEM6E (trademark of polyethylene glycol monomethacrylate having a molecular weight of about 350, manufactured by Dai-ichi Kogyo Seiyaku Co., Ltd.), 4 parts of azobisisobutyronitrile and 20 parts of isobutyl alcohol was fed dropwise over a period of 3 hours. The resultant mixture was matured at 110° C. for 30 minutes. Then an additional catalytic mixture of 15 parts of ethylene glycol monobutyl ether and 0.5 part of azobisisobutyronitrile was added dropwise over a period of one hour. The resultant mixture was matured at 110° C. for one hour, and was then cooled, and, thus, a solution of ionic functional group-containing resin (B-3) having a solids content of 55% was obtained. This resin (B-3) had a hydroxyl value of 43 mg KOH/g and a weight average molecular weight of about 20,000.

Preparation of Aqueous Primer

Example 1

Aqueous polypropylene/ethylene copolymer (A-1) (ethylene-propylene copolymer (ethylene content: 5%) obtained by using a metallocene catalyst was modified by the addition of 8% by weight of maleic acid to have a melting point of 80° C., Mw of about 100,000, Mw/Mn of about 2.1, and was then equivalently neutralized with dimethyl ethanolamine, and was further made water-dispersible with 10 parts of emulsifier per 100 parts of polypropylene/ethylene copolymer) in an amount of 55 parts by weight of solid content, UX5210 (trademark of urethane dispersion manufactured by Sanyo Chemical Industries, Ltd.) in an amount of 30 parts by weight of solid content, a solution of ionic functional group-containing resin (B-1) in an amount of 15 parts by weight of solid content, JR-806 (trademark of titanium white manufactured by TAYCA Corporation) in an amount of 120 parts and conductive carbon (carbon black pigment; specific surface area: 1200 $m^2/g$) in an amount of 4 parts were blended by an ordinary method, and the resultant mixture was diluted with deionized water to give a solids content of 40%, and, thus, an aqueous primer (1) was obtained.

Example 2

Aqueous chlorinated polypropylene (A-2) (polypropylene obtained by using a metallocene catalyst was modified by the addition of 3% by weight of maleic acid and 22% of chlorine to have a melting point of 85° C., Mw of about 120,000, Mw/Mn of about 2.9, and was then equivalently neutralized with dimethyl ethanolamine, and was further made water-dispersible with 10 parts of emulsifier per 100 parts of maleated polypropylene) in an amount of 40 parts by weight of solid content, UX5210 in an amount of 35 parts by weight of solid content, a solution of ionic functional group-containing resin (B-2) in an amount of 15 parts by weight of solid content, MFK-60X (trademark of adduct of polyisocyanate with active methylene manufactured by Asahi Chemical Industry Co., Ltd.) in an amount of 10 parts by weight of solid content, JR-903 (trademark of titanium white manufactured by TAYCA Corporation) in an amount of 120 parts and conductive carbon (carbon black pigment; specific surface area: 800 $m^2/g$) in an amount of 4 parts were blended by an ordinary method, and the resultant mixture was diluted with deionized water to give a solids content of 40%, and, thus, an aqueous primer (2) was obtained.

Example 3

Aqueous dispersion of maleated polypropylene (A-3) (polypropylene obtained by using a metallocene catalyst was modified by the addition of 4% by weight of maleic acid to have a melting point of 70° C., Mw of about 80,000, Mw/Mn of about 2.3, and was then equivalently neutralized with dimethyl ethanolamine, and was further made water-dispersible with 10 parts of emulsifier per 100 parts of polypropylene) in an amount of 40 parts by weight of solid content, Takerakku W-405 (trademark of urethane dispersion manufactured by Mitsui Takeda Chemicals, Inc.) in an amount of 25 parts by weight of solid content, Bon Coat MK-250 (trademark of acrylic emulsion manufactured by Dainippon Ink & Chemicals Inc.) in an amount of 30 parts by weight of solid content, BYK-154 (trademark of polyacrylic acid salt resin having quaternary ammonium salt as a counter ion manufactured by BYK-Chemie Inc.) in an amount of 5 parts by weight of solid content, JR-806 in an amount of 120 parts and conductive carbon (carbon black pigment; specific surface area: 1200 $m^2/g$) in an amount of 3 parts were blended by an ordinary method, and the resultant mixture was diluted with deionized water to give a solids content of 40%, and, thus, an aqueous primer (3) was obtained.

Example 4

Aqueous dispersion of maleated polypropylene (A-4) (polypropylene obtained by using a metallocene catalyst was modified by the addition of 4% by weight of maleic acid to have a melting point of 90° C., Mw of about 120,000, Mw/Mn of about 2.2, and was then equivalently neutralized with dimethyl ethanolamine, and was further made water-dispersible with 10 parts of emulsifier per 100 parts of polypropylene) in an amount of 50 parts by weight of solid content, UX5210 in an amount of 30 parts by weight of solid content, a solution of ionic functional group-containing resin (B-2) in an amount of 20 parts by weight of solid content, JR-903 in an amount of 100 parts and conductive carbon (carbon nanotube; specific surface area: 1200 $m^2/g$) in an amount of 35 parts were blended by an ordinary method, and the resultant mixture was diluted with deionized water to give a solids content of 40%, and, thus, an aqueous primer (4) was obtained.

Example 5

Aqueous polypropylene/ethylene copolymer (A-1) in an amount of 45 parts by weight of solid content, UX5210 in an amount of 30 parts by weight of solid content, Denacol EM-150 (trademark of cresol novolak type epoxyemulsion manufactured by Nagase Chemtex Corporation) in an amount of 10 parts by weight of solid content, a solution of ionic functional group-containing resin (B-3) in an amount of 15 parts by weight of solid content, JR-806 in an amount of 120 parts and conductive carbon (carbon black pigment; specific surface area: 1200 $m^2/g$) in an amount of 4 parts were blended by an ordinary method, and the resultant mixture was diluted with deionized water to give a solids content of 40%, and, thus, an aqueous primer (5) was obtained.

Example 6

Aqueous chlorinated polypropylene (A-2) in an amount of 40 parts by weight of solid content, UX5210 in an amount of 20 parts by weight of solid content, Denacol EM-150 in an amount of 15 parts by weight of solid content, a solution of ionic functional group-containing resin (B-1) in an amount of 15 parts by weight of solid content, MFK-60X in an amount of 10 parts by weight of solid content, JR-903 in an amount of 120 parts and conductive carbon (carbon black pigment; specific surface area: 800 $m^2/g$) in an amount of 4 parts were blended by an ordinary method, and the resultant mixture was diluted with deionized water to give a solids content of 40%, and, thus, an aqueous primer (6) was obtained.

Example 7

Aqueous dispersion of modified polypropylene (A-5) (Note 1) in an amount of 55 parts by weight of solid content, UX5210 in an amount of 30 parts by weight of solid content, a solution of ionic functional group-containing resin (B-1) in an amount of 15 parts by weight of solid content, JR-806 in an amount of 120 parts and conductive carbon (carbon black pigment; specific surface area: 1200 $m^2/g$) in an amount of 4 parts were blended by an ordinary method, and the resultant mixture was diluted with deionized water to give a solids content of 40%, and, thus, an aqueous primer (7) was obtained.

(Note 1) Aqueous Dispersion of Modified Polypropylene (A-5):

In a four-necked flask equipped with stirrer, condenser, thermometer and dropping funnel, 100 g of maleic anhydride-grafted polypropylene (polypropylene obtained by using a metallocene catalyst was modified by the addition of 4% by weight of maleic acid to have a melting point of 80° C., Mw of about 150,000, Mw/Mn of about 2.5) was heat-melted at 140° C. Then, 15 g of polyoxyethylene stearylether (Newcol 1820: trademark of polyoxyethylene compound terminated with hydroxyl group on one side, manufactured by Nippon Nyukazai Co., Ltd.) was added, and the resultant mixture was made to react at 140° C. for four hours with stirring. After reaction was over, the mixture was cooled to 90° C., and, then, deionized water was added. The mixture was filtrated to give aqueous dispersion of modified polypropylene (A-5) which had a solids content of 30%.

Example 8

Aqueous dispersion of modified polypropylene (A-6) (Note 2) in an amount of 55 parts by weight of solid content, UX5210 in an amount of 30 parts by weight of solid content, a solution of ionic functional group-containing resin (B-1) in an amount of 15 parts by weight of solid content, JR-806 in an amount of 120 parts and conductive carbon (carbon black pigment; specific surface area: 1200 $m^2/g$) in an amount of 4 parts were blended by an ordinary method, and the resultant mixture was diluted with deionized water to give a solids content of 40%, and, thus, an aqueous primer (8) was obtained.

(Note 1) Aqueous Dispersion of Modified Polypropylene (A-6):

In a four-necked flask equipped with stirrer, condenser, thermometer and dropping funnel, 200 g of maleic anhydride-grafted polypropylene (polypropylene obtained by using a metallocene catalyst was modified by the addition of 4% by weight of maleic acid to have a melting point of 80° C., Mw of about 150,000, Mw/Mn of about 2.5) was heat-melted at 120° C. Then, 10 g of 2-hydroxyacrylate, 0.1 g of polymerization inhibitor (di-t-butylhydroxytoluene) and 2.0 g of triethylamine were added, and the resultant mixture was stirred for one hour. To this mixture, 30 g of polyethylene glycol monomethacrylate (Blenmer PE-350; manufactured by Nippon Oil & Fats Co., Ltd.) and 0.3 g of polymerization initiator (Perbutyl O; trademark of product manufactured by Nippon Oil & Fats Co., Ltd.) were added with stirring over a period of one hour to allow this mixture to react. After reaction was over, 4 g of triethylamine was added. After stirred for 30 minutes, the mixture was cooled to 90° C., and, then, deionized water was added. The mixture was filtrated to give aqueous dispersion of modified polypropylene (A-6) which had a solids content of 30%.

Example 9

Aqueous polypropylene/ethylene copolymer (A-1) in an amount of 55 parts by weight of solid content, UX5210 in an amount of 20 parts by weight of solid content, a solution of ionic functional group-containing resin (B-1) in an amount of 15 parts by weight of solid content, MFK-60X in an amount of 10 parts by weight of solid content, JR-806 in an amount of 120 parts and conductive carbon (carbon black pigment; specific surface area: 1200 m²/g) in an amount of 4 parts were blended by an ordinary method, and the resultant mixture was diluted with deionized water to give a solids content of 40%, and, thus, an aqueous primer (9) was obtained.

Example 10

Aqueous chlorinated polypropylene (A-2) in an amount of 40 parts by weight of solid content, UX5210 in an amount of 45 parts by weight of solid content, a solution of ionic functional group-containing resin (B-2) in an amount of 15 parts by weight of solid content, JR-903 in an amount of 120 parts and conductive carbon (carbon black pigment; specific surface area: 800 m²/g) in an amount of 4 parts were blended by an ordinary method, and the resultant mixture was diluted with deionized water to give a solids content of 40%, and, thus, an aqueous primer (10) was obtained.

Comparative Example 1

Aqueous polypropylene/ethylene copolymer (A-7) (ethylene-propylene copolymer (ethylene content: 5%) obtained by using a metallocene catalyst was modified by the addition of 8% by weight of maleic acid to have a melting point of 140° C., Mw of about 200,000, Mw/Mn of about 2.1, and was then equivalently neutralized with dimethyl ethanolamine, and was further made water-dispersible with 10 parts of emulsifier per 100 parts of polypropylene/ethylene copolymer) in an amount of 55 parts by weight of solid content, UX5210 in an amount of 30 parts by weight of solid content, a solution of ionic functional group-containing resin (B-1) in an amount of 15 parts by weight of solid content, JR-806 in an amount of 120 parts and conductive carbon (carbon black pigment; specific surface area: 1200 m²/g) in an amount of 4 parts were blended by an ordinary method, and the resultant mixture was diluted with deionized water to give a solids content of 40%, and, thus, an aqueous primer (11) was obtained.

Comparative Example 2

Aqueous chlorinated polypropylene (A-2) in an amount of 40 parts by weight of solid content, UX5210 in an amount of 50 parts by weight of solid content, MFK-60X in an amount of 10 parts by weight of solid content, JR-903 in an amount of 120 parts and conductive carbon (carbon black pigment; specific surface area: 800 m²/g) in an amount of 4 parts were blended by an ordinary method, and the resultant mixture was diluted with deionized water to give a solids content of 40%, and, thus, an aqueous primer (12) was obtained.

Comparative Example 3

Aqueous dispersion of maleated polypropylene (A-3) in an amount of 40 parts by weight of solid content, Takerakku W-405 in an amount of 25 parts by weight of solid content, Bon Coat MK-250 in an amount of 30 parts by weight of solid content, BYK-154 in an amount of 5 parts by weight of solid content and JR-806 in an amount of 120 parts were blended by an ordinary method, and the resultant mixture was diluted with deionized water to give a solids content of 40%, and, thus, an aqueous primer (13) was obtained.

Production of Test Substrate

Polypropylene (degreased) molded into the form of bumper was coated by spraying with each of aqueous primer, which had been prepared in the above-mentioned manner and was chosen as shown in Table 1, to a dry film thickness of about 10 μm. After preheated at 80° C. for 3 minutes, thus coated molding was further coated with WBC #713T (trademark of aqueous colored base paint manufactured by Kansai Paint) as colored base paint by electrostatic deposition to a dry film thickness of about 15 μm. After again preheated at 80° C. for 3 minutes, thus coated molding was further coated with Soflex #520 Clear (trademark of acrylic urethane-based solvent-type clear paint manufactured by Kansai Paint) as clear paint by electrostatic deposition to a dry film thickness of about 30 μm. Thus coated molding was then heated and dried at 120° C. for 30 minutes to give a test substrate.

Each of test substrate as produced in the above-mentioned manner was subjected to performance test as mentioned below. Results are shown in Table 1.

Method of Performance Test (*1) Value (L value):

Polypropylene plate was coated by spraying with each of aqueous primers (1) to (13) to a dry film thickness of about 20 μm. Each of thus formed primer coating film was heated at 80° C. for 10 minutes, and was then measured by Color Computer SM-7 (trademark of the product manufactured by Suga Test Instruments Co., Ltd.) for L value of the surface of coating film.

(*2) Surface Resistivity of the Surface of Primer Coating Film:

Polypropylene plate was coated by spraying with each of aqueous primers (1) to (13) to a dry film thickness of about 20 μm. Each of thus formed primer coating film was heated at 80° C. for 10 minutes, and was then measured by MODEL 150 (trademark of the product manufactured by TREK, INC.) for the surface resistivity (Ω/sq) of the surface of coating film.

(*3) Initial Adhesion:

Cuts were made on the coating film surface of each of the test substrates with a cutter to reach the substrate, so that one hundred 2 mm×2 mm squares might be formed. Adhesive cellophane tape was applied to thus cut surface, and was subsequently abruptly peeled off at 20° C. Evaluation was made according to the number of remaining squares of coating film, by the following criteria.

O: one hundred (no peeling)
X: 99 or less (*4) Water-Resistance:

A portion of painted bumper as test substrate was cut out, immersed in warm water at 40° C. for 10 days. After taken out and dried, each of the test substrate was subjected to adhesion test in the same manner as in the above-mentioned initial adhesion test. The number of remaining squares of coating film was investigated, and, furthermore, the coated surface was visually observed after substrate was taken out, and, thus, evaluation was made by the following criteria.

O: No blister occurred.
X: Blister occurred.

(*5) Gasohol Resistance:

A portion of painted bumper as test substrate was cut out, immersed in regular gasoline/ethanol=9/1 (v/v) at 20° C. for one hour. After taken out, each of the test substrate was subjected to visual observation of the state of coated surface such as peeling of edges, and was evaluated by the following criteria.

O: No problem
Δ: Peeling of less than 3 mm
X: Peeling of 3 mm or more

TABLE 1

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | Comparative Example 1 | Comparative Example 2 | Comparative Example 3 |
| Aqueous primer | (1) | (2) | (3) | (4) | (5) | (6) | (7) | (8) | (9) | (10) | (11) | (12) | (13) |
| L value | 42 | 46 | 46 | 51 | 44 | 48 | 43 | 43 | 42 | 46 | 41 | 34 | 90 |
| Surface resistivity ($\Omega$/sq) | $1 \times 10^6$ | $3 \times 10^6$ | $9 \times 10^5$ | $2 \times 10^7$ | $3 \times 10^6$ | $5 \times 10^6$ | $2 \times 10^6$ | $2 \times 10^6$ | $3 \times 10^6$ | $3 \times 10^6$ | $1 \times 10^6$ | $7 \times 10^8$ | $3 \times 10^{11}$ |
| Initial adhesion | ○ | ○ | ○ | ○ | ○ | ○ | ○ | ○ | ○ | ○ | ○ | ○ | ○ |
| Water resistance (adhesion) | ○ | ○ | ○ | ○ | ○ | ○ | ○ | ○ | ○ | ○ | X | ○ | ○ |
| Water resistance (blister) | ○ | ○ | ○ | ○ | ○ | ○ | ○ | ○ | ○ | ○ | X | ○ | ○ |
| Gasohol resistance | ○ | ○ | ○ | ○ | ○ | ○ | ○ | ○ | ○ | ○ | X | ○ | ○ |

The invention claimed is:

1. An aqueous primer composition which comprises:
   (A) an aqueous dispersion of modified polyolefin which comprises an unsaturated carboxylic acid- or acid anhydride-modified polyolefin (a) having a melting point of 120° C. or lower and a weight average molecular weight of 30,000 to 180,000, dispersed in an aqueous medium,
   (B) an ionic functional group-containing acrylic resin, and
   (C) a conductive carbon-containing pigment,
   which forms a coating film with an L value of 35 or more and a surface resistivity of $1 \times 10^8$ $\Omega$/sq or less,
   wherein the ionic functional group-containing acrylic resin (B) has at least one species of ionic functional group selected from tertiary amino group and quaternary ammonium base, and has an ionic functional group containing unsaturated monomer unit in an amount ranging from 1 to 40 mole %.

2. The aqueous primer composition of claim 1 wherein modified polyolefin (a) is maleic acid- or maleic anhydride-modified polyolefin.

3. The aqueous primer composition of claim 1 wherein modified polyolefin (a) has a melting point in a range of 50 to 100° C.

4. The aqueous primer composition of claim 1 wherein modified polyolefin (a) has a weight average molecular weight in a range of 50,000 to 120,000.

5. The aqueous primer composition of claim 1 wherein modified polyolefin (a) has a ratio (Mw/Mn) of weight average molecular weight to number average molecular weight of 1.5 to 4.0.

6. The aqueous primer composition of claim 1 wherein polyolefin of modified polyolefin (a) is produced with a single site catalyst as polymerization catalyst.

7. The aqueous primer composition of claim 1 wherein modified polyolefin (a) has a melting heat in a range of 1 to 50 mJ/mg.

8. The aqueous primer composition of claim 1 wherein acrylic resin (B) further contains polyoxyalkylene chain.

9. The aqueous primer composition of claim 8 wherein acrylic resin (B) is produced by the copolymerization of 0.5 to 20% by weight of ionic functional group-containing polymerizable unsaturated monomer, 10 to 30% by weight of polymerizable unsaturated monomer having polyoxyalkylene chain and 50 to 89.5% by weight of other ethylenically unsaturated monomer.

10. The aqueous primer composition of claim 1 wherein acrylic resin (B) has a weight average molecular weight in a range of 5,000 to 300,000.

11. The aqueous primer composition of claim 1 which comprises 20 to 90% by weight of aqueous dispersion (A) and 0.5 to 50% by weight of acrylic resin (B), based on the solid content of total resin in the composition.

12. The aqueous primer composition of claim 1 wherein conductive carbon has a specific surface area of 600 m²/g or more.

13. The aqueous primer composition of claim 1 wherein pigment (C) further contains white pigment.

14. The aqueous primer composition of claim 1 which comprises 0.5 to 30 parts by weight of pigment (C) per 100 parts by weight of solid content of total resin in the composition.

15. The aqueous primer composition of claim 1 which further contains urethane resin.

16. The aqueous primer composition of claim 1 which further contains a crosslinking agent.

17. A method for coating a plastic molding which comprises coating a plastic molding with an aqueous primer composition of claim 1, and subsequently with a top coating on the surface of the applied aqueous primer composition.

18. An article which has been coated by the method of claim 1.

* * * * *